United States Patent Office 2,922,700
Patented Jan. 26, 1960

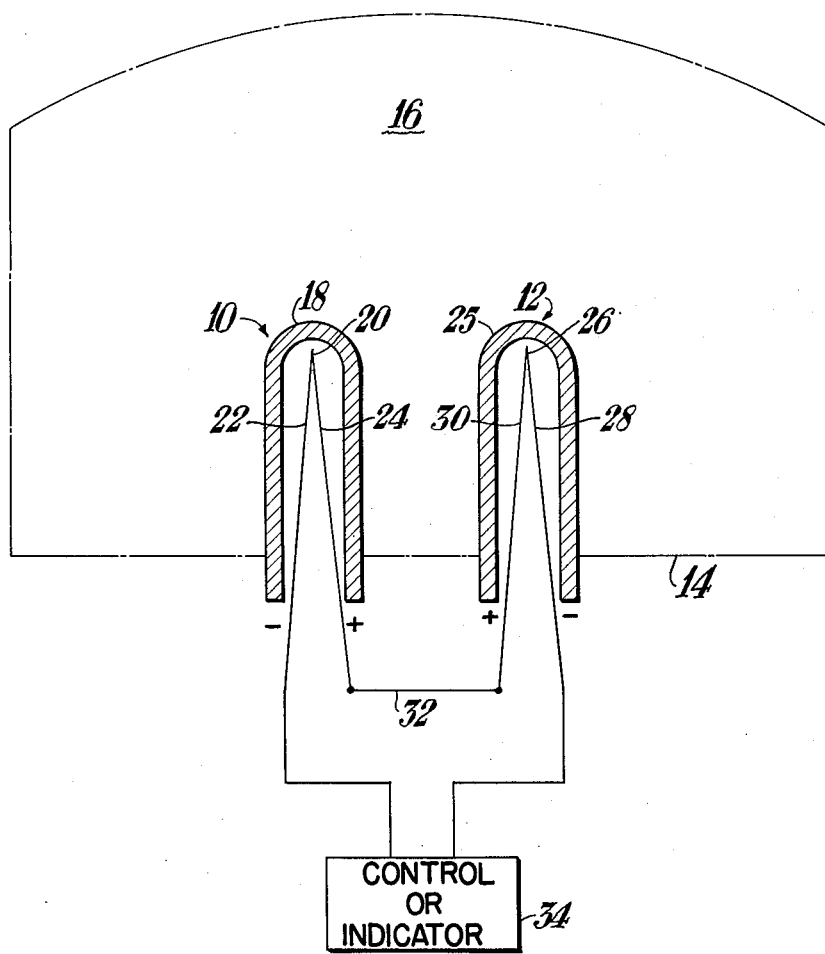

2,922,700

DEVICE FOR INDICATING OR CONTROLLING THE ATMOSPHERE IN A FURNACE

Charles D. Lawhon, Stratford, Conn., assignor to Robertshaw-Fulton Controls Company, Richmond, Va., a corporation of Delaware Application August 8, 1955, Serial No. 526,951

2 Claims. (Cl. 23—255)

This invention relates to apparatus for analyzing the chemical properties of a medium and more particularly to a device for indicating or controlling the chemical properties of an atmosphere within a furnace or combustion chamber.

In a heat treating process it is often desired to control the atmosphere of the furnace. For example a reducing atmosphere may be used to remove oxide from the surface of metals during an annealing operation, while another process may require an oxidizing atmosphere for maintaining an oxide coating on the metal. Also, in the case of furnaces or boilers for heating or power purposes, it is essential that efficient combustion is maintained for economy reasons. Thus, it is necessary to accurately determine the air-fuel ratio and the products of combustion.

In modern applications, heat treating processes and combustion require extremely sensitive control and a means is obviously necessary for properly indicating or controlling the atmosphere in the combustion chamber or furnace. In the past it has been customary to analyze the atmosphere of a furnace by withdrawing a sample of gas from the desired location and then analyzing the same exteriorly of the furnace. This method has proven satisfactory in applications wherein the atmosphere of the furnace is relatively constant, however, it is obvious that this method would not be satisfactory in an application wherein the atmosphere of the furnace could be continuously varying.

It is an object of this invention to give a continuous indication of the atmosphere in a furnace.

Another object of this invention is to continuously analyze the atmosphere interiorly of the furnace and indicate the results of the analysis exteriorly of the furnace.

In a preferred embodiment of the invention, two thermocouples are connected in series and positioned within the combustion chamber of a furnace. One thermocouple is provided with a casing which is thermally affected by an oxidizing atmosphere, while the other thermocouple is affected thermally by reducing atmosphere. The resultant electromotive force and direction of current flow from the thermocouples is indicative of the atmosphere of the furnace.

Other objects and advantages will become apparent from the following description taken in connection with the accompanying drawing which is a schematic showing of the indicating or controlling device embodying this invention.

Referring more particularly to the drawing, the indicating device includes two thermocouple assemblies 10, 12 which may be installed by mounting through suitable apertures in a wall of a heat treating or heat producing apparatus 14 having an interior chamber 16 for heat treating or combustion. The thermocouple assembly 10 includes a tubular housing 18 which is fixed in the wall 14 and encloses a thermojunction 20. The thermojunction 20 is provided with a negative lead 22 and a positive lead 24 which extend from the housing 20 for connection to an electric circuit later to be described.

The thermocouple assembly 12 is similar to the assembly 10 and includes a tubular housing 25 and a thermojunction 26 having a negative lead 28 and a positive lead 30 extending from the housing 25. The thermojunctions 20, 26 may be of any suitable type which will produce an electromotive force upon heating, and since such devices are well known in the art, further description is deemed unnecessary.

For a purpose later to be described, the thermojunctions 20, 26 are connected in series whereby the E.M.F.'s produced at any given temperature by the junctions 20, 26 will be in opposition. To this end, the positive leads 24, 30 of the junctions 20, 26 respectively are connected by a jumper 32. The negative leads 22, 28 may be connected to any suitable control or indicating or recording device 34 utilizing a changing voltage or current.

The tubular housing 18 is preferably formed from material, such as carbon, which will oxidize in the presence of an oxidizing atmosphere but will be unaffected by a reducing atmosphere. The housing 25 is preferably formed from a material, such as copper oxide, which will not be affected by an oxidizing atmosphere, but will be reduced in the presence of a reducing atmosphere.

*Operation*

Assuming as a first condition that the atmosphere of the combustion chamber 16 is neither oxidizing or reducing then neither of the housings 18, 25 will be chemically affected and the temperature of the thermojunctions 20, 26 will correspond to the temperature of the combustion chamber 16. Since the junctions 20, 26 are connected in opposition, the E.M.F.'s produced thereby will be equal and in opposition. Thus, no current will flow in the leads 22, 28 to the control indicator 34.

Assume now as a second condition that a reducing atmosphere such as free hydrogen exists in the combustion chamber 16. In this case, the carbon housing 18 will be unaffected. However, the copper oxide housing 25 will be reduced by the free hydrogen in accordance with the following equation: $CuO + H_2 = Cu + H_2O$. The heat produced by a decomposition of copper oxide and formation of water effects the thermocouple assembly 12 to increase the temperature of the junction 26 and thus the E.M.F. produced thereby. The E.M.F. produced by the junction 26 is now greater than the E.M.F. produced by the junction 20. Thus, a resultant E.M.F. is established which causes current to flow in the electric circuit through lead wires 22, 28 and through the control or indicator 34.

If the atmosphere of the combustion chamber 16 should change to an oxidizing one, the copper oxide housing 25 will be unaffected. However in this condition, the carbon housing 18 will be oxidized by the free oxygen in accordance with the following equation: $C + O_2 = CO_2$. The heat produced by oxidation or burning of the carbon housing 18 will increase the temperature of the junction 20 and thus the E.M.F. produced thereby. The E.M.F. of the junction 20 now being greater than the E.M.F. produced by the junction 26 causes current to flow in the circuit. However, in this condition, the current flow will be in a direction opposite from the current flow in the previous condition since the E.M.F.'s of the two junctions 20, 26 are in opposition.

It should now be apparent that the direction of current flow in the wires 22, 28 indicates whether the atmosphere within the combustion chamber 16 is reducing or oxidizing and that the magnitude of the current indicates the intensity of the atmosphere. Thus, the device is capable of analyzing the atmosphere within the combustion chamber 16 and controlling, indicating or recording the results exteriorly thereof.

The invention is not limited to the above-mentioned materials of construction but could be made to work properly if the gas sensitive housing were made of any substance that would give off heat during oxidation or reduction. Thus, by varying the materials from which the housings 18, 25 are formed, the device can be made responsive to various chemical conditions. Also the temperature sensing elements are not confined to thermocouples, but could be made of any of any thermosensitive material such as, but not limited to, resistance elements.

While only one embodiment of the invention has been herein shown and described, it will be obvious to those skilled in the art that the invention may be variously embodied and the changes be made in the construction and arrangement of parts without departing from the scope of the invention as defined in the appended claims.

It is claimed and desired to secure by Letters Patent:

1. In an atmosphere analyzing device for furnaces and the like having a combustion chamber, the combination comprising a pair of gas sensitive tubular housings adapted to be mounted to extend into the combustion chamber for exposure to the atmospheric gases within the combustion chamber, one of said tubular housings being constructed of a reducible material which is adapted to be variable in temperature by a change in the intensity of a reducing atmosphere within the combustion chamber, the other of said tubular housings being constructed of an oxidizable material which is adapted to be variable in temperature by a change in the intensity of an oxidizing atmosphere within the combustion chamber, a first thermocouple located within one of said tubular housings and responsive to the temperature variations thereof to generate an electric current in one direction, a second thermocouple located within said other of said tubular housings and responsive to the temperature variations thereof to generate an electric current in an opposite direction, and electric circuit means including said thermocouples electrically connected in series and in opposition, the direction of current flow through said electric circuit means being indicative of the type of atmosphere within the combustion chamber.

2. The combination as claimed in claim 1 wherein the reducible material for the said one of said tubular housings is copper oxide and the oxidizable material for the said other of said tubular housings is carbon.

References Cited in the file of this patent

UNITED STATES PATENTS

| | | |
|---|---|---|
| 2,114,401 | Price | Apr. 19, 1938 |
| 2,293,550 | Kells | Aug. 18, 1942 |
| 2,444,613 | McCombie et al. | July 6, 1948 |
| 2,541,857 | Besselman et al. | Feb. 13, 1951 |
| 2,581,812 | Page | Jan. 8, 1952 |
| 2,619,409 | Spracklen | Nov. 25, 1952 |
| 2,639,978 | Zaikowsky | May 26, 1953 |
| 2,817,229 | Beard | Dec. 24, 1957 |